United States Patent
Ben Zvi et al.

(10) Patent No.: US 12,401,658 B1
(45) Date of Patent: Aug. 26, 2025

(54) MANAGEMENT OF ENTITIES AND ELEMENTS OF A NETWORK

(71) Applicant: Axonius Solutions Ltd., Tel-Aviv (IL)

(72) Inventors: Gil Ben Zvi, Hod HaSharon (IL); Roee Salomon, Herzeliya (IL)

(73) Assignee: Axonius Solutions Ltd., Tel-Aviv (IL)

( * ) Notice: Subject to any disclaimer, the term of this patent is extended or adjusted under 35 U.S.C. 154(b) by 0 days.

(21) Appl. No.: 18/900,985

(22) Filed: Sep. 30, 2024

(51) Int. Cl.
*H04L 9/40* (2022.01)
*G06F 16/901* (2019.01)

(52) U.S. Cl.
CPC ........ *H04L 63/105* (2013.01); *G06F 16/9024* (2019.01); *H04L 63/104* (2013.01)

(58) Field of Classification Search
CPC .. H04L 63/105; H04L 63/104; G06F 16/9024
USPC .......................................................... 726/4
See application file for complete search history.

(56) References Cited

U.S. PATENT DOCUMENTS

| | | | | |
|---|---|---|---|---|
| 10,198,469 | B1* | 2/2019 | Wright | G06F 16/9038 |
| 10,742,670 | B1* | 8/2020 | Kayyoor | G06F 21/56 |
| 11,360,987 | B2* | 6/2022 | Jain | G06F 16/288 |
| 11,711,374 | B2* | 7/2023 | Ross | G06F 21/604 726/28 |
| 2021/0185058 | A1* | 6/2021 | Gitelman | H04L 63/1416 |
| 2023/0088415 | A1* | 3/2023 | Friedlander | H04L 63/102 726/23 |
| 2023/0195701 | A1* | 6/2023 | Christner | G06F 16/211 707/803 |
| 2023/0208840 | A1* | 6/2023 | Venable | H04L 63/102 726/1 |
| 2025/0103650 | A1* | 3/2025 | Punniyamurthy | G06F 16/9024 |

OTHER PUBLICATIONS

Dynamic Multi-Attribute Security Permission Management for Edge Devices in Power Internet of Things, Want et al, Jan. 2024 (Year: 2024).*

* cited by examiner

Primary Examiner — Jahangir Kabir

(57) ABSTRACT

There is provided a method for automated permission management, comprising: accessing a graph including nodes denoting different groups having different access permissions levels, each group associated with a set of user identities, the graph including edges between nodes that represent at least a partial subset of one another, each edge associated with a score indicating an accuracy of containment between groups connected by the edge, dynamically adapting a tolerance parameter indicating a threshold for amount of accuracy of containment of user identities between different groups, dynamically adapting the graph by creating or removing edges between nodes according to the score of the respective edges relative to the threshold, automatically merging access permission levels of at least two groups connected by an edge for automatically eliminating redundant access permission levels of the groups, and automatically updating access permission levels of the at least two groups according to the dynamically updated graph.

23 Claims, 5 Drawing Sheets

MANAGEMENT OF ENTITIES AND ELEMENTS OF A NETWORK

BACKGROUND

The present invention, in some embodiments thereof, relates to a network analysis and, more specifically, but not exclusively, to systems and methods for management of entities of a network.

Entities in a network may be managed, for example, by overseeing, coordinating, and/or maintaining the various devices, users, and systems that operate within a network. These entities can include, for example, routers, servers, computers, mobile devices, IoT devices, applications, users, and more. Network management ensures that these entities function efficiently, securely, and reliably, supporting the overall goals of the organization or infrastructure.

SUMMARY

According to some embodiments of the present invention, a computer implemented method of automated permission management of user identities of a network, comprises: accessing a graph including a plurality of nodes denoting a plurality of different groups having different access permissions levels for accessing data sources and/or services of a network, each group associated with a respective set of user identities, the graph including edges between nodes that represent at least a partial subset of one another, each edge associated with a score indicating an accuracy of containment between groups connected by the edge, dynamically adapting a tolerance parameter indicating a threshold for amount of accuracy of containment of user identities between different groups, in response to the dynamic adaptation of the tolerance parameter, dynamically adapting the graph by creating or removing edges between nodes according to the score of the respective edges relative to the threshold defined by the tolerance parameter, for creating a dynamically updated graph, automatically merging access permission levels of at least two groups connected by an edge for automatically eliminating redundant access permission levels of the at least two groups, and automatically updating access permission levels of the at least two groups according to the dynamically updated graph.

Optionally, edges with highest scores closest to the tolerance parameter without exceeding the tolerance parameter are created or maintained between nodes.

Optionally, the edges with highest scores are created by removing other edges with scores lower than the highest scores.

Optionally, all user identities of a certain group are assigned the same access permission level of the certain group.

Optionally, the groups are selected from: department, division, a title, and a certain number of years of experience.

Optionally, further comprising: extracting the plurality of groups from the network, extracting the plurality of user identities from the network, mapping the plurality of users to the plurality of groups, creating the graph by arranging the plurality of groups into the plurality of nodes, and linking nodes with edges according to sets of user identities of groups that are subsets of one another.

Optionally, the graph is dynamically adapted by: computing the score between a first group and a second group which are not connected by an edge, adding a new edge between the first group and the second group when the score is below the threshold, and removing an existing edge between a pair of groups when the score of the existing edge is above the threshold.

Optionally, the graph is iteratively generated, starting from an group with a largest number of user identities to an group with a smallest number of user identities, wherein in each iteration a node representing a certain group is connected to relevant predecessor nodes representing predecessor nodes of which the certain group includes at least a subset of user identities of the predecessor nodes.

Optionally, further comprising: automatically detecting an anomaly node not connected to any of the other nodes, automatically removing access permissions of the groups of the node, and automatically removing the anomaly node from the graph.

Optionally, further comprising: automatically detecting an anomaly node that is a predecessor of all leaf nodes, automatically revoking access permissions of the groups of the node, and automatically removing the anomaly node from the graph.

Optionally, the tolerance parameter is dynamically adapted by a control graphical element presented within a graphical user interface (GUI) simultaneously presenting the graph, wherein the graph is dynamically updated in response to dynamic adaptations of the control graphical element.

Optionally, the control graphical element is implemented as at least one of: a slide widget, a dial, and a field for manual entry of a number.

Optionally, the graph is directed and acyclic, the direction of an edge indicating direction of containment of a certain group by a predecessor group.

Optionally, the score is a function of a first subset of user identities of a certain group included in a predecessor group connected to the certain group by an edge, and of a second subset of user identities of the certain group not included in the predecessor group.

Optionally, the score of each edge represents an accuracy of a first node of the edge being contained by a second node of the edge.

Optionally, the score of an edge indicates a magnitude of a distance between two groups connected by the edge, wherein a larger distance indicates a larger mismatch between user identities of the two groups connected by the edge.

Optionally, first nodes of edges having scores lower than then tolerance parameter are defined as predecessors of second nodes connected to the first nodes by the respective edges.

Optionally, the score of zero indicates that a first group is a proper subset of a second group connected by the edge, and an increasing value greater than zero indicates that the first group is an increasingly mismatching subset of the second group.

Optionally, a number of edges of the graph is increased with increasing value of the tolerance parameter, and the number of edges of the graph is decreased with decreasing value of the tolerance parameter.

Optionally, an edge between a first group and second group is created by setting the first group as a predecessor of the second group, wherein at least one user identity of the second group is a subset of user identities of the first group.

Optionally, the graph is dynamically updated according to dynamic updates of groups of the network and/or dynamic updates of user identities of the groups of the network, and in response to the dynamic update of the graph, the tolerance parameter is dynamically updated, and the automatically merging is updated.

Optionally, further comprising: presenting the graph within a GUI, wherein the GUI simultaneously presents an interactive control graphical element denoting a value of a tolerance parameter indicating a threshold for amount of containment between different groups, receiving via the GUI, a dynamic adaptation of the tolerance parameter denoted by dynamic interaction with the interactive control graphical element, and dynamically adapting the graph, within the GUI, by creating or removing edges between nodes according to the score of the respective edges relative to the threshold defined by the tolerance parameter.

Optionally, further comprising automatically updating access permission levels of the at least two groups according to the dynamically adapted graph.

Optionally, further comprising, via the GUI, receiving a selection of at least two groups connected by an edge, and automatically merging the selected at least two groups into a single group.

According to some embodiments of the present invention, a computer implemented method of automated management of rules within a network, comprises: accessing a graph including a plurality of nodes denoting a plurality of different rules of a network associated with different resources of the network, each rule associated with a respective set of elements representing expressions of the rule, the graph including edges between nodes that represent at least a partial subset of one another, each edge associated with a score indicating an accuracy of containment between entities connected by the edge, dynamically adapting a tolerance parameter indicating a threshold for amount of accuracy of containment of elements between different rules, in response to the dynamic adaptation of the tolerance parameter, dynamically adapting the graph by creating or removing edges between nodes according to the score of the respective edges relative to the threshold defined by the tolerance parameter, for creating a dynamically updated graph, automatically merging at least two rules connected by an edge for automatically eliminating redundant rules, and automatically updating parameters of the network associated with the at least two rules according to the dynamically updated graph.

According to some embodiments of the present invention, a computer implemented method of automated management of entities of a network, comprises: accessing a graph including a plurality of nodes denoting a plurality of different entities having different attributes, each entity associated with a respective set of elements, the graph including edges between nodes that represent at least a partial subset of one another, each edge associated with a score indicating an accuracy of containment between entities connected by the edge, dynamically adapting a tolerance parameter indicating a threshold for amount of accuracy of containment of elements between different entities, in response to the dynamic adaptation of the tolerance parameter, dynamically adapting the graph by creating or removing edges between nodes according to the score of the respective edges relative to the threshold defined by the tolerance parameter, and automatically merging attributes of at least two entities connected by an edge for automatically eliminating redundant attributes of the at least two entities.

Optionally, edges with highest scores closest to the tolerance parameter without exceeding the tolerance parameter are created or maintained between nodes.

Optionally, the edges with highest scores are created by removing other edges with scores lower than the highest scores.

Optionally, all user identities of a certain group are assigned the same access attribute of the certain group.

Optionally, edges with highest scores closest to the tolerance parameter without exceeding the tolerance parameter are created or maintained between nodes.

Optionally, the edges with highest scores are created by removing other edges with scores lower than the highest scores.

Optionally, further comprising: extracting the plurality of entities of a network, extracting the plurality of elements of the plurality of entities of the network, creating the graph by arranging the plurality of entities into the plurality of nodes, and linking nodes with edges according to sets of elements of entities that are subsets of one another.

Optionally, the graph is dynamically adapted by: computing the score between a first entity and a second entity which are not connected by an edge, adding a new edge between the first entity and the second entity when the score is below the threshold, and removing an existing edge between a pair of entities when the score of the existing edge is above the threshold.

Optionally, the graph is iteratively generated, starting from an entity with a largest number of elements to an entity with a smallest number of elements, wherein in each iteration a node representing a certain entity is connected to relevant predecessor nodes representing predecessor nodes of which the certain entity includes at least a subset of elements of the predecessor nodes.

Optionally, further comprising: automatically detecting an anomaly node not connected to any of the other nodes, automatically removing attributes of the entities of the node, and automatically removing the anomaly node from the graph.

Optionally, further comprising: automatically detecting an anomaly node that is a predecessor of all leaf nodes, automatically revoking attributes of the entities of the node, and automatically removing the anomaly node from the graph.

Optionally, the tolerance parameter is dynamically adapted by a control graphical element presented within a graphical user interface (GUI) simultaneously presenting the graph, wherein the graph is dynamically updated in response to dynamic adaptations of the control graphical element.

Optionally, the control graphical element is implemented as at least one of: a slide widget, a dial, and a field for manual entry of a number.

Optionally, the graph is directed and acyclic, the direction of an edge indicating direction of containment of a certain entity by a predecessor entity.

Optionally, the score is a function of a first subset of elements of a certain entity included in a predecessor entity connected to the certain entity by an edge, and of a second subset of elements of the certain entity not included in the predecessor entity.

Optionally, the score of each edge represents an accuracy of a first node of the edge being contained by a second node of the edge.

Optionally, the score of an edge indicates a magnitude of a distance between two entities connected by the edge, wherein a larger distance indicates a larger mismatch between elements of the two entities connected by the edge.

Optionally, first nodes of edges having scores lower than then tolerance parameter are defined as predecessors of second nodes connected to the first nodes by the respective edges.

Optionally, the score of zero indicates that a first entity is a proper subset of a second entity connected by the edge, and an increasing value greater than zero indicates that the first entity is an increasingly mismatching subset of the second entity.

Optionally, a number of edges of the graph is increased with increasing value of the tolerance parameter, and the number of edges of the graph is decreased with decreasing value of the tolerance parameter.

Optionally, an edge between a first entity and second entity is created by setting the first entity as a predecessor of the second entity, wherein at least one element of the second entity is a subset of elements of the first entity.

Optionally, the graph is dynamically updated according to dynamic updates of entities of the network and/or dynamic updates of elements of the entities of the network, and in response to the dynamic update of the graph, the tolerance parameter is dynamically updated, and the automatically merging is updated.

Optionally, further comprising, via a GUI presenting the graph, receiving a selection of at least two entities connected by an edge, and automatically merging the selected at least two entities into a single entity.

Optionally, further comprising automatically updating attributes of the at least two groups according to the dynamically adapted graph.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
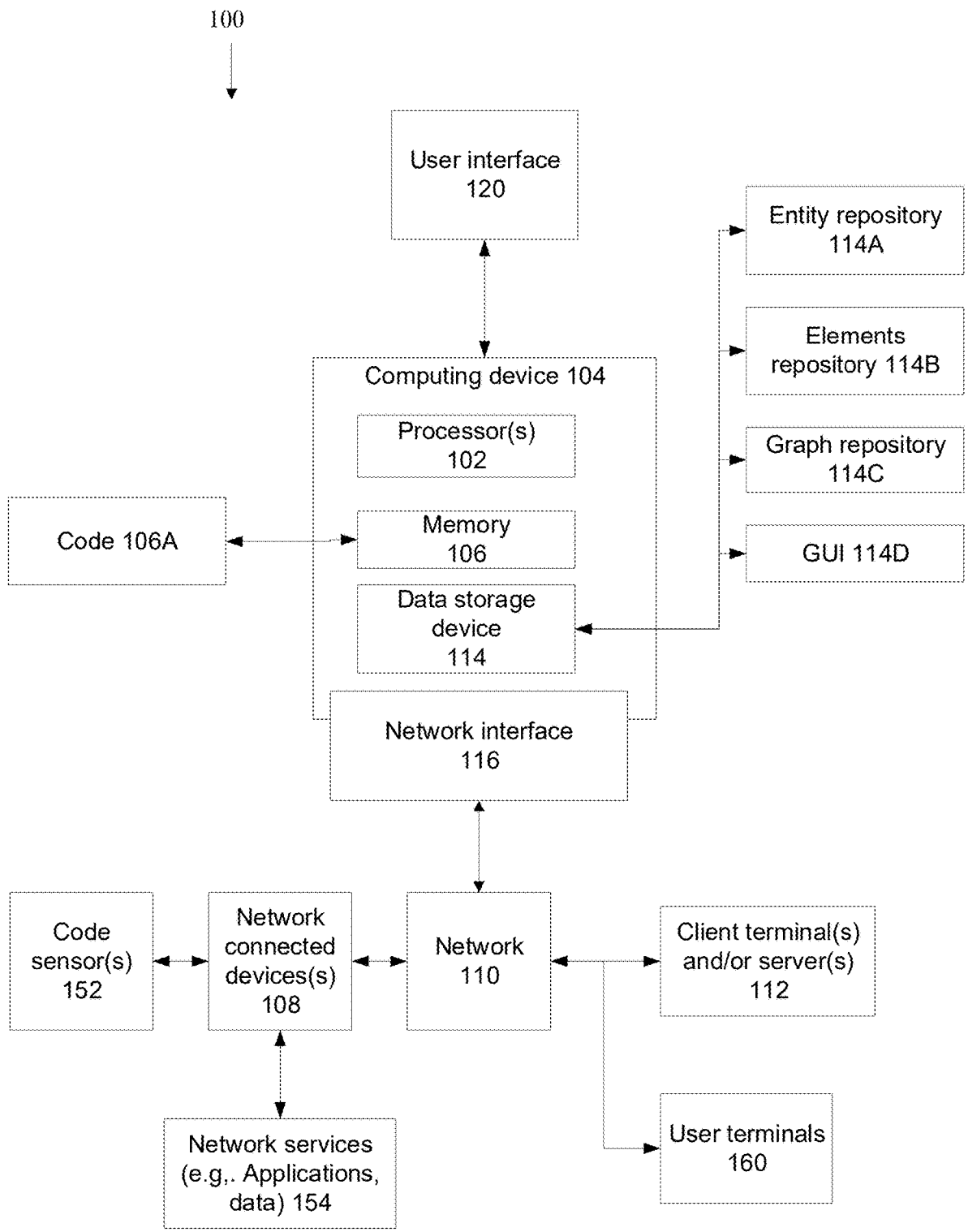
FIG. 1 is a block diagram of components of a system for creation and/or adaptation of a graph of entities of elements where edges are created or removed according to a score of the edge indicating an accuracy of containment between entities, in accordance with some embodiments of the present invention.

The present invention, in some embodiments thereof, relates to a network analysis and, more specifically, but not exclusively, to systems and methods for management of entities of a network.

An aspect of some embodiments of the present invention relates to systems, methods, computing devices, and/or code instructions (stored on a data storage device and executable by one or more processors for creating and/or adapting a graph for management of entities of a network. A graph is accessed and/or created. The graph includes nodes denoting different entities of the network which may have different attributes, for example, users of the network, employees of an organization, and literals of rules. Each entity is associated with a respective set of elements, for example, user groups, departments of the organization, and rules. Edges connect nodes (i.e., entities represented by the nodes) such that one entity at one end of the edge is at least a partial subset of the other entity at the other end of the edge, in terms of the elements of the entities. For edges to connect entities, one entity overlaps with (e.g., includes, intersection) at least one element of the other entity. For example, a first entity includes the elements $\{1,2,3,4\}$ and the second entity includes the elements $\{4,5,6\}$. Each edge is associated with a score indicating an accuracy of containment between the entities connected by the edge. A score of zero may indicate perfect containment, i.e., maximum overlap (e.g., intersection), between elements of the entities, for example, $\{1,2,3,4,5,\}$ and $\{2,3,5\}$. An increasing score, up to a maximum defined value, denotes reduced increasingly inaccurate containment, i.e., decreasing overlap (e.g., intersection), between the element of the entities, for example, $\{1,2,3,4,5\}$ and $\{1,2,3,4,6\}$ may be associated with a score of 0.1, $\{1,2,3,4,5\}$ and $\{1,2,7,8\}$ may be associated with a score of 0.4. A tolerance parameter indicating a threshold for the scores of the edges (e.g., denoting amount of accuracy of containment of elements between different entities) may be dynamically adapted. The tolerance parameter may indicate a sensitivity of the inclusion between the entities. In response to the dynamic adaptation of the tolerance parameter, the graph is dynamically adapted by creating or removing edges between nodes according to the score of the respective edges relative to the threshold defined by the tolerance parameter. A "soft subset" may be a set of elements of an entity that is almost contained within the other subset of elements of the other entity, and adjustable based on the threshold of the tolerance value. Higher scores of edges between entities, up to the value of the threshold are created or maintained. Lower scores of edges may be removed for creating new edges.

Automated actions may be performed on the graph, for example, for reducing redundancies between similar entities and/or for removing and/or correcting anomaly entities. This may help improve efficiency of management of the entities of the graph. For example, attributes of at least two entities connected by an edge may be automatically merged for automatically eliminating redundant attributes of the at least two entities. Parameters and/or configuration of the network may be adapted according to the adapted graph. For example, access permissions of groups may be automatically updated based on the adapted graph.

In an example to help understand the impact of dynamic adaptation of the tolerance parameter on the structure (i.e., location of edges connecting nodes representing entities) of the graph:

The entity {1, 2, 3, . . . , 40} is a proper subset of the entity {1, 2, 3, . . . , 40, . . . , 50}. This is not a "soft" inclusion but a standard one; under a tolerance parameter of 0.0 or higher, the former entity is said to be a predecessor of the latter entity, trigger generation of an edge on the graph between the two entities.

Entity {1, 2, 3, . . . , 40, 51} is almost a subset of entity {1, 2, 3, . . . , 40, . . . , 50}. Setting the tolerance parameter to a higher value than 0.0, makes this case qualify as a "soft" inclusion. The former entity is said to be a predecessor of the latter entity. An edge on the graph is dynamically generated between the two entities. It is noted that setting the tolerance parameter to 0.0 won't result in an edge on the graph between the two entities, as one is not a true subset of the other.

It is noted that as described herein, the terms permission and entitlement may sometimes be interchanged and/or are sometimes used interchangeably. For example, permissions may refer to access permission of specific user credentials, whereas entitlements may refer to other entities and/or elements such as groups, roles, resources, and applications.

At least one embodiment described herein addresses the technical problem of management of entities and/or elements, optionally of a network. At least one embodiment described herein improves the technical field of management of entities and/or elements, optionally of a network.

At least one embodiment described herein improves upon prior approaches of management of entities and/or elements, optionally of a network. At least one embodiment described herein provides at least one practical application of management of entities and/or elements, optionally of a network.

At least one embodiment described herein addresses the technical problem of management of permissions (or entitlements) of users of a network. At least one embodiment described herein improves the technical field of management of permissions (or entitlements) of users of a network. At least one embodiment described herein improves upon prior approaches of management of permissions (or entitlements) of users of a network. At least one embodiment described herein provides at least one practical application of management of permissions (or entitlements) of users of a network.

At least one embodiment described herein addresses the technical problem of management of rules of a network. At least one embodiment described herein improves the technical field of management of rules of a network. At least one embodiment described herein improves upon prior approaches of management of rules of a network. At least one embodiment described herein provides at least one practical application of management of rules of a network. Rules may be defined in a network, for example, for access control, for a firewall, for quality of service (QOS), and the like.

At least one embodiment described herein addresses the aforementioned technical problem(s), and/or improves upon the aforementioned technical field, and/or improves upon the aforementioned prior approaches, and/or enables the at least one practical application, by generating a graph depicting relationships between entities (where each entity is associated with elements), and dynamically adapting the graph by creating or removing edges between entities in response to dynamic adaptation of a tolerance parameter. The tolerance parameter may be used as a threshold for evaluation of scores between entities. Scores represent the amount of overlap (e.g. intersection) and/or inclusion between entities with respect to their elements. A lower score represents a higher overlap (e.g., intersection) and/or inclusion. A higher score represents lower overlap (e.g., intersection) and/or lower inclusion. A greater number of edges is created in response to a higher tolerance parameter, since more entities which are imprecise sets of each other are found. A smaller number of edges is created in response to a lower tolerance parameter, since there are fewer entities which are more precise sets of each other. Entities of the adapted graph may be merged and/or anomaly entities may be removed or corrected based on the adapted graph. Parameters and/or configuration of the network may be updated according to the adapted graph, optionally automatically.

At least one embodiment described herein relates to modeling and/or visualizing dynamically entities (e.g. permissions of users of a network for accessing different services and/or applications) into a graph, also referred to herein as a "soft" Subset Graph, where each node represents a specific entity (and all the users of the node have the specific entity entity) and every edge represents a "soft" containment connection between two entities. "Soft" implies there is a tolerance for the extent of which a set is defined as a "contained" within another.

The graphs provides a simple way to model entities of a network in a way that can be easily visualized and dynamically modified. The graph structure helps to understand the connections and hierarchy of the entities, allows to simulate modifications, narrow down redundant entities, and other features described herein. The graph may help provide the complete picture of the entities' structure within the network (e.g., organization) and automate or semi-automate optimizations.

At least one embodiment described herein addresses the technical challenge of finding an efficient way to dynamically connect all relevant nodes to each other and to implement it with the soft condition parameter.

Exemplary potential advantages of at least one embodiment that generates and/or uses the graph include:

The graph may take into account entities, which may be abstract, in addition to and/or as alternative to standard network (e.g., organizational) entities.

In at least one embodiment links between seemingly unrelated families of entities are found, by adapting the tolerance parameter and analyzing the dynamically adapted graph generated in response.

In at least one embodiment adapting the tolerance parameter may enable a user to decide what will be considered as a containment of entities.

On the visualization level, an interactive graph is provided, where a user may change the tolerance parameter and see the resulting changes on the graph in real time (or near real time).

The graph is not constrained to a tree structure and/or may overall support more flexible and/or complex structures.

At least one embodiment described herein based on the graph improves upon prior approaches, for example, a simple organization tree (e.g. a graph of departments within a division), based on organizational entities (e.g., department, division etc.). The tree does not model entities' connections according to their elements. It is easier to use an existing hierarchical organization tree without taking into account the employees within it. A standard human resources application provides a standard organization tree (that cannot be generalized to non-organizational entities). The graph may be used to generalize the concept of organizational tree to all kinds of entities which may include abstract entities, for example, permissions, rules and so on.

The graph may generalize the concept of "organizational tree" (e.g., a graph of departments within a division) to all kinds of abstract entities, for example, permissions, rules and so on. The graph implementation doesn't have the constraints of a tree structure. Moreover, the graph implementation may overall support more flexible and/or complex structures. Each entity may be characterized by a set of elements that share the entity. These entities may be compared based on these sets by a "soft inclusion" metric, where its tolerance is configurable. For example, a zero tolerance denotes as a strict containment of one set by another, and a higher tolerance value will allow almost-contained connections.

At least one embodiment described herein based on the graph may be used as an analytical feature for IT and/or security users to model the network (e.g., organization) over various entity types, simulate cases and/or take action in order to optimize the overall structure.

At least one embodiment described herein based on the graph may be used for identity management, for example, representing and/or manipulating connections between SaaS users (or users of other application and/or services), employees, entitlements (permissions, roles, resources etc.), rules and so on. For example, efficiently managing identities within a company. By manipulating the graph and/or tolerance parameter, as described herein, the user can eliminate or combine redundant or similar permissions or rules, for reducing the required maintenance of these inventories.

At least one embodiment described herein provides visualization of the connections of entities within a network (e.g., organization), such as how user parameters (e.g., department, title, years of experience etc.) interact with one another, how different rules interacts with one another, and so on. The information, including the elements, entities, their names and/or descriptions as well links between entities, are presented by the graph.

At least one embodiment described herein provides for optimization of the entities. By finding the connections between entities, eliminating and/or consolidating and/or creation of entities and/or elements that are redundant may be performed, optionally automatically. This can be conducted dynamically, supporting ongoing changes in the organization structure, employee status, new SaaS applications and so on. For example, if one permission is contained (employee-wise) in another, one of them might be eliminated and all its employees might get the other permission.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
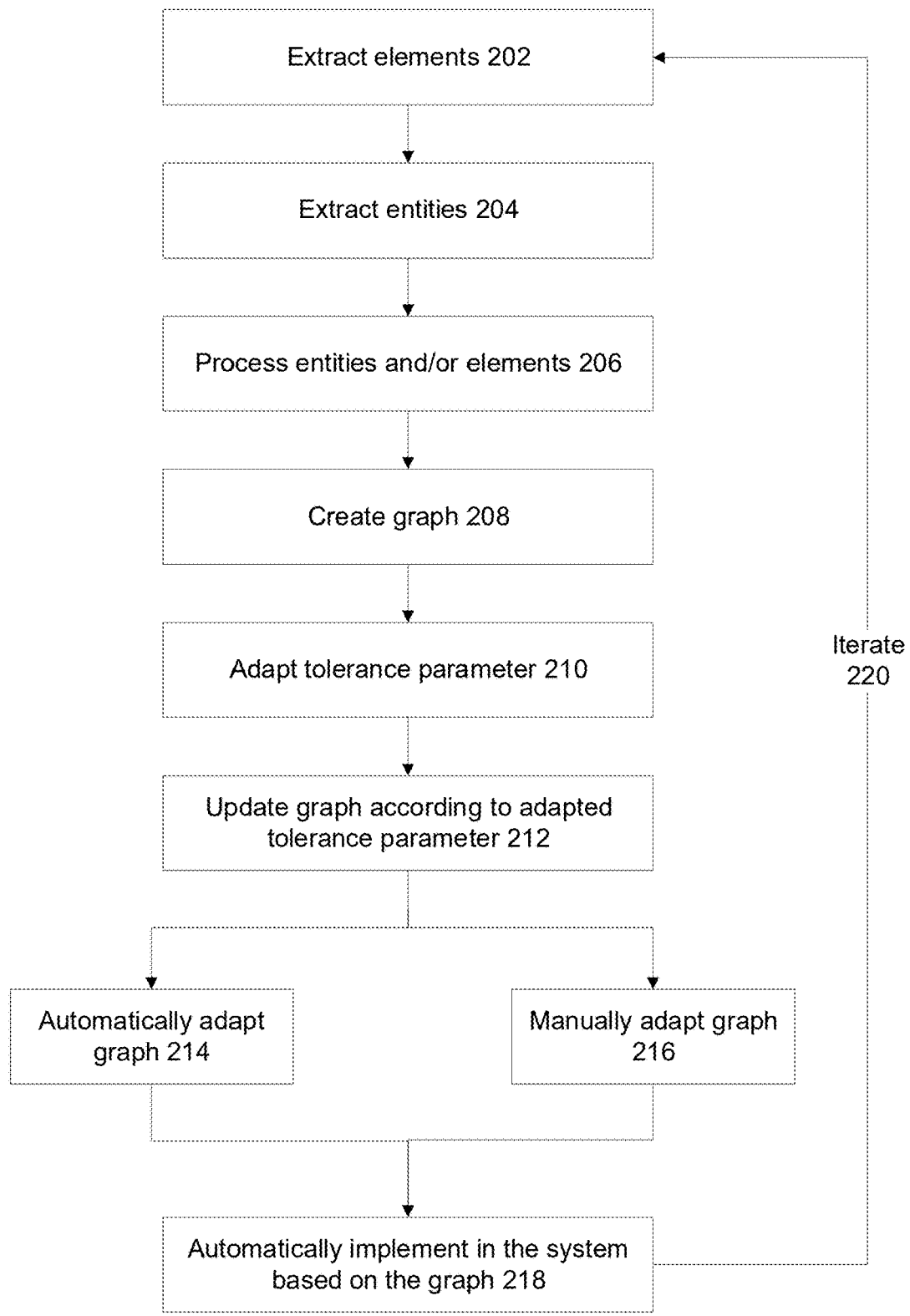
FIG. 2 is flowchart of a method of creation and/or adaptation of a graph of entities of elements where edges are created or removed according to a score of the edge indicating an accuracy of containment between entities, in accordance with some embodiments of the present invention.
Figure 3A:
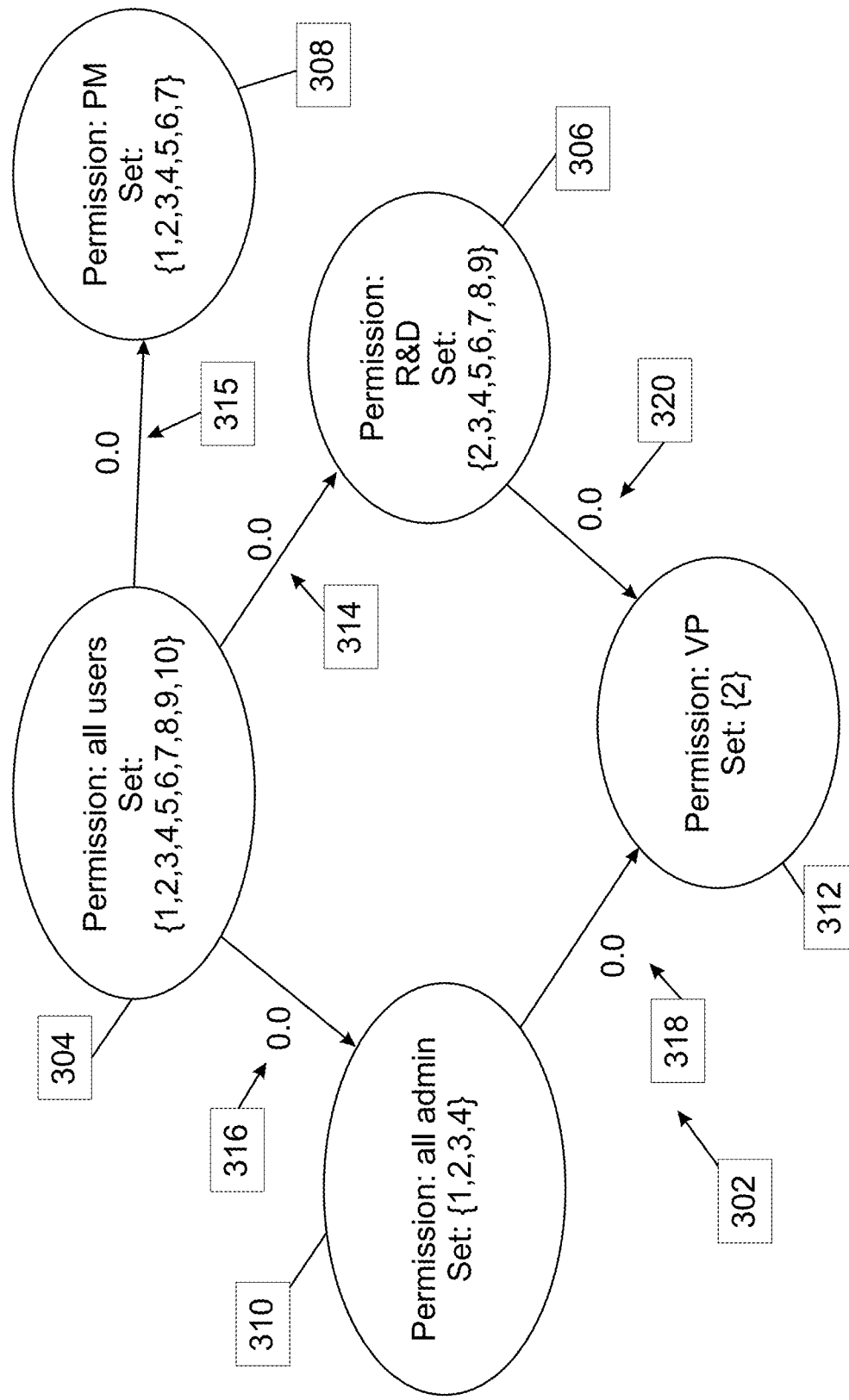
FIGS. 3A-3C includes are schematics depicting dynamic adaptation of a graph in response to dynamic changes in a value of a tolerance parameter, in accordance with some embodiments of the present invention.
Figure 3B:
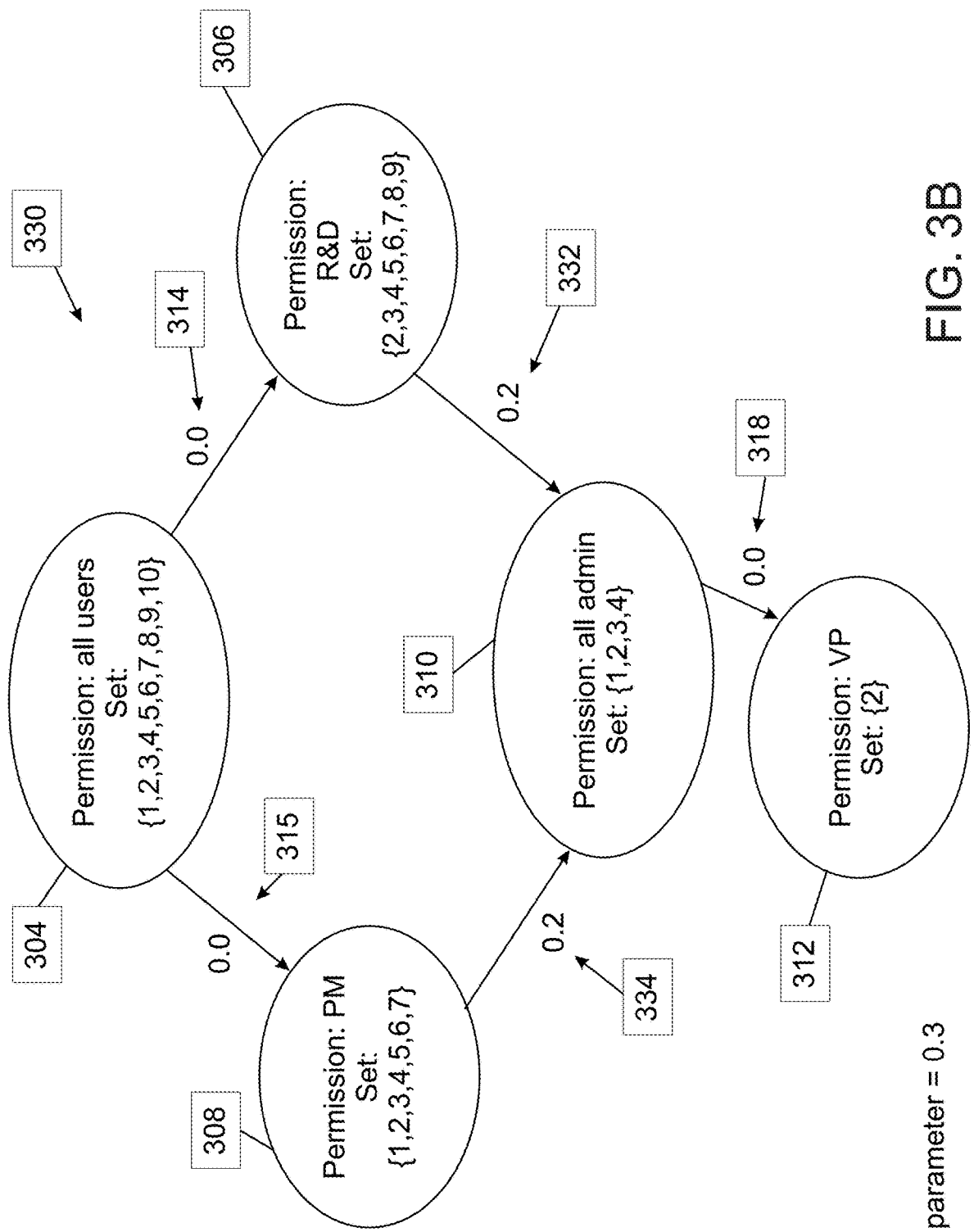
Figure 3C:
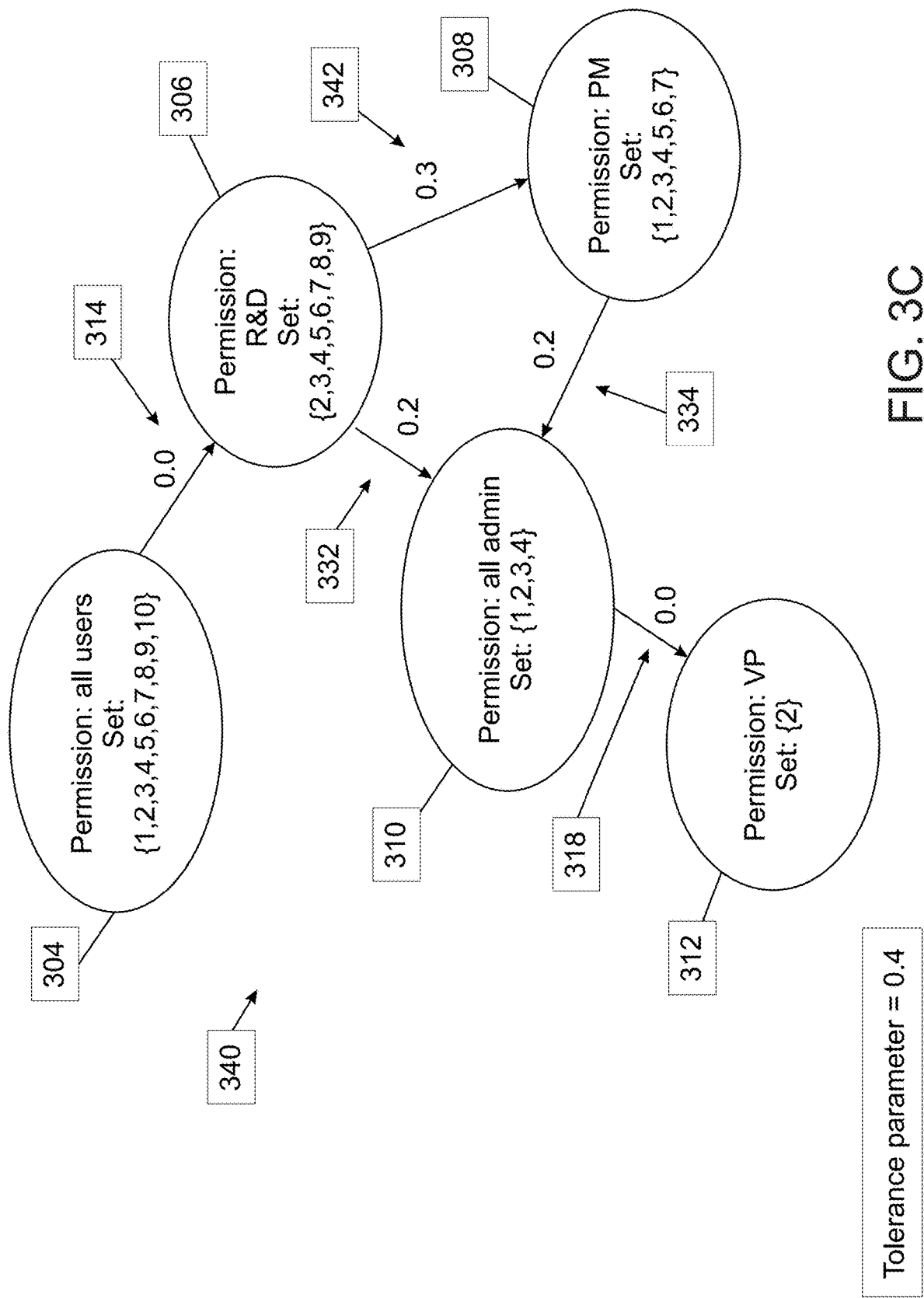

Reference is now made to FIG. 1, which is a block diagram of components of a system 100 for creation and/or adaptation of a graph of entities of elements where edges are created or removed according to a score of the edge indicating an accuracy of containment between entities, in accordance with some embodiments of the present invention. Reference is also made to FIG. 2, which is flowchart of a method of creation and/or adaptation of a graph of entities of elements where edges are created or removed according to a score of the edge indicating an accuracy of containment between entities, in accordance with some embodiments of the present invention. Reference is also made to FIGS. 3A-3C, which are schematics depicting dynamic adaptation of a graph in response to dynamic changes in a value of a tolerance parameter, in accordance with some embodiments of the present invention.

System 100 may implement the acts of the method described with reference to FIGS. 2-3A-3C by processor(s) 102 of a computing device 104 executing code instructions stored in a memory 106 (also referred to as a program store).

Computing device 104 may be implemented as, for example one or more and/or combination of: a group of connected devices, a client terminal, a server, a virtual server, a computing cloud, a virtual machine, a desktop computer, a thin client, a network node, and/or a mobile device (e.g., a Smartphone, a Tablet computer, a laptop computer, a wearable computer, glasses computer, and a watch computer).

Computing device 104 creates a graph based on entities and/or elements extracted from a network 110, optionally by code sensors 152. Entities and/or elements may be extracted from network connected devices 108 connected to network 110. Network connected devices 108 may host one or more network services 154 which may be accessed by one or more users via user terminals 160 (e.g., client, mobile device, desktop, server, tablet). Examples of network services 154 include applications, data, and the like, for example, device and user management consoles, endpoint security agents, networking, identity access management, vulnerability management, patch management, cloud provider, browsers, spreadsheet, graphic design, document editing, web browser, games, email, videoconference, and the like.

Examples of network connected devices 108 include to one or more of: client terminal(s), server(s), virtual machine (s), computing cloud(s), virtual server(s), storage device(s), mobile device(s), a router, bridge, and the like. Network connected devices 108 may include to external computing environments that provide external services to one or more users of network 110 and/or to one or more network connected devices(s) 108 of network 110. The external computing environments may include, for example, external computing clouds, and external servers. The external services may include, for example, data storage, database management, external applications, and/or external libraries. The external services may be accessed, for example, via a set of user credentials, passwords, secret keys, virtual interfaces (e.g., application programming interface (API) and/or software development kit (SDK)), and the like.

Multiple architectures of system 100 based on computing device 104 may be implemented. For example:

A centralized architecture. Computing device 104 executing stored code instructions 106A, may be implemented as one or more servers (e.g., network server, web server, a computing cloud, a virtual server) that provides centralized services (e.g., one or more of the acts described with reference to FIGS. 2-3A-3C) to one or more client terminals and/or servers 112 over a network 110. For example, providing software as a service (SaaS) to the client terminal(s) 112 (and/or servers), providing software services accessible using a software interface (e.g., application programming interface (API), software development kit (SDK)), providing an application for local download to the client terminal(s) 112 (and/or servers), providing an add-on to a web browser running on client terminal(s) 112 (and/or servers), and/or providing functions using a remote access session to client terminal(s) 112 (and/or servers), such as through a web browser executed by client terminal(s) 112 (and/or servers) accessing a web site hosted by computing device 104. For example, each client terminal and/or server 112 is associated with its own network with its own set of users, network connected devices, and/or network services. Computing device 102 obtains the extracted entities and/or elements from the network associated with each respective client terminal and/or server 112, generates a graph (as described herein), and provides the graph to the respective client terminal and/or server 112, for adaptation of the tolerance parameter and/or adaptation of the graph, and/or other automatic features implemented using the graph, as described herein.

A local architecture. Computing device 104 executing stored code instructions 106A that implement one or more of the acts described with reference to FIGS. 2-3A-3C may be implemented on a network device in communication with network 110, for example, an administrative server. Computing device 102 obtains the extracted entities and/or elements from network 110, generates a graph (as described herein), and provides the graph for adaptation of the tolerance parameter and/or adaptation of the graph, and/or other automatic features implemented using the graph, as described herein.

Hardware processor(s) 102 of computing device 104 may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 102 may include a single processor, or multiple processors (homogenous or heterogeneous) arranged for parallel processing, as clusters and/or as one or more multi core processing devices.

Memory 106 stores code instructions executable by hardware processor(s) 102, for example, a random access memory (RAM), read-only memory (ROM), and/or a storage device, for example, non-volatile memory, magnetic media, semiconductor memory devices, hard drive, removable storage, and optical media (e.g., DVD, CD-ROM). Memory 106 stores code 106A that implements one or more features and/or acts of the method described with reference to FIGS. 2-3A-3C when executed by hardware processor(s) 102.

Computing device 104 may include a data storage device 114 for storing data, for example, entity repository 114A set to store entities extracted from network 110, element repository 114B set to store entities extracted from network 110, graph repository 114C set to store graphs created from the entities and/or elements, and GUI 114D designed to present and/or dynamically adapt the graph, as described herein. Data storage device 114 may be implemented as, for example, a memory, a local hard-drive, virtual storage, a removable storage unit, an optical disk, a storage device, and/or as a remote server and/or computing cloud (e.g., accessed using a network connection).

Network 110 may be implemented as, for example, the internet, a local area network, a virtual network, a wireless network, a cellular network, a local bus, a point to point link (e.g., wired), and/or combinations of the aforementioned.

Computing device 104 may include a network interface 116 for connecting to network 110, for example, one or more of, a network interface card, a wireless interface to connect to a wireless network, a physical interface for connecting to a cable for network connectivity, a virtual interface implemented in software, network communication software providing higher layers of network connectivity, and/or other implementations.

Computing device 104 includes and/or is in communication with one or more physical user interfaces 120 that include a mechanism for a user to view data (e.g., the GUI presenting the graph) and/or interact with the data (e.g., interact with the GUI presenting the graph). Exemplary user interfaces 120 include, for example, one or more of, a touchscreen, a display, a virtual reality display (e.g., headset), gesture activation devices, a keyboard, a mouse, and voice activated software using speakers and microphone.

Code sensor(s) 152 may extract entities and/or elements from network 110 and/or from network connected devices 108. Code sensor(s) 152 may monitor network 110 and/or network connected devices 108 for changes, and obtain update entities and/or elements for updating the graph.

At 202, elements are extracted and/or accessed. The elements may be extracted from a network, that includes multiple network connected devices and/or users using user identities to access data and/or services.

The elements may be extracted, for example, by code sensors which many monitor the network and/or crawl the network to identify the elements, and/or may analyze the network (e.g., intercept packets, access a database of devices connected to the network, and/or users of the network).

The type of extracted elements may correspond to the type of entities which are extracted (e.g., as described with reference to 204 of FIG. 2). The type of extracted elements represent the purpose of the graph being created, i.e., the aspects (e.g., of the network) being analyzed using the graph.

Examples of elements include: identities of users of the network, employees of an organization represented by the network, and literals of rules.

It is to be understood that elements (e.g., of a set of a certain entity, as described with reference to 204 of FIG. 2) cannot be manipulated, since they are determined externally (e.g., each department has its own employee, and employee cannot simply be "eliminated" from the department) by a user creating and/or manipulating the graph.

The extracted elements may include indications of user credentials of users using the network, optionally, all the users within the organization.

Extracted elements may include user characteristics, as collected, created and/or enriched by different sources, the user entitlements, and/or several other informative fields. For example, extracted entities might include fields such as user department and title, as retrieved by Okta or Azure (or both). Extract elements might include all the permissions and groups the user is assigned to. Extract elements might include fields such as the user status (whether the user is active/inactive), etc.

At 204, entities are extracted and/or accessed. The entities may be extracted from a network, that includes multiple network connected devices and/or users using user identities to access data and/or services.

The entities may be associated with different attributes.

The entities and/or attributes of the entities may be extracted, for example, by code sensors which many monitor the network and/or crawl the network to identify the entities and/or attributes of the entities, and/or may analyze the network (e.g., intercept packets, access a database of devices connected to the network, and/or users of the network).

The type of extracted entities may correspond to the type of elements which are extracted (e.g., as described with reference to 202 of FIG. 2). The type of extracted entities represent the purpose of the graph being created, i.e., the aspects (e.g., of the network) being analyzed using the graph.

Entities and elements may be extracted simultaneously and/or by a common process. Alternatively or additionally, entities and elements may be extracted independently such as by different processes.

An entity may include a set of elements, and optionally a name and/or label. For example, an entity may represent permission of type "admin", where the corresponding set of elements of the entity include user credentials (e.g., of employees) in a specific account having this particular permission.

Each entity is characterized by a set of elements. The elements may define the entity. For example, groups of elements are organized into respective entities. For example, user IDs denoting elements may be arranged into access permission groups denoting entities.

An entity may be associated with an attribute. The attribute may be characterized by a set of elements. For example, the entity may be departments, and the elements may be identifiers of users of the network associated to the respective department, and the attribute may be access permissions assigned to the user identifiers of the department, such as for accessing data and/or services (e.g., external and/or internal). All user identifiers of a certain group are assigned the same attribute, for example, the same access permission level. Examples of groups include departments, divisions, titles, and a certain number of users of experience. For example, a department is a user attribute that can be identified by all the employees that it consists of. In another example, a rule is an IT attribute that can be identified by all the literals in its expression.

An entity may be an abstract entity.

Examples of entities include: department, title, location, years of experience, groups, permissions, and granted applications.

The entities may be groups. An inventory of all the groups in the network (e.g., organization) may be collected, created and/or enriched by different sources.

Examples of entities:
Organizational entities, such as department, division, title, years of experience.
Entitlements, such as permissions, assigned groups, roles, granted applications, resources.
Rules, characterized by the expression literal that they are consisting of. An inventory of the rules used in the network (e.g., in the organization), as collected, created and/or or enriched by the different sources and/or creators.
Roles: An inventory of the roles of users using the network (e.g., in the organization), optionally, as collected, created and/or enriched by the different sources.
Permissions: An inventory of the permissions of users using the network (e.g., in the organization), as collected, created and/or enriched by the different sources.

At 206, the extracted entities and/or elements may be processed.

The elements may be arranged into entities. For example, when entities and elements are determined independently, the elements may be mapped to the entities. For example, a first dataset of user identifiers of users of the network is accessed, to obtain the elements of user identities. A second dataset of departments of an organization is accessed, to obtain the entities of departments. The user identities are mapped to the departments.

It is noted that the nature of the entities is not as significant, as long as the sets characterizing them are of the same elements. For example, the employee title and age are not exactly related, but they are comparable as both entities are characterized by sets of employees (the age "30-40" includes employees with IDs A, B, C . . . and the title "Developer" includes employees A, G, F, . . . ). The entities may be considered "abstract" in the sense they may be defined by their sets of elements and not other features.

A score may be computed between pairs of entities. Optionally, a score is computed between each pair of entities that are defined. The score may be computed on a scale, for example, 0-1, 0-10, 0-100, and the like.

The score may represent one or more of the following:
A magnitude of a distance between two entities according to respective elements. A score of zero (or other extreme range value) may denote a distance of zero between the entities, such as one entity lies entire within the other entity. A vector representation of each entity may be defined according to the elements. The distance may be computed between vectors of elements. A score of zero may indicate that one entity is a maximum distance from the other entity. A relatively larger score indicates a relatively larger distance between the two entities.
An amount of mismatch and/or overlap (e.g., intersection) between the two entities according to respective elements. Zero indicates a perfect overlap (e.g., intersection) and/or no mismatch between the elements of the two entities. A larger value indicates increasing mismatch and/or decreasing overlap (e.g., intersection) between the elements of the two entities. A maximum value indicates complete mismatch and/or no overlap (e.g., intersection) between the elements.
The score between two entities may represent an accuracy of a first entity being contained by the second entity.
The score may be a function of a first subset of elements of a certain entity included in a predecessor entity of the pair (e.g., connected to the certain entity by an edge), and of a second subset of elements of the certain entity not included in the predecessor entity.

At 208, a graph is created and/or accessed. The graph may be presented on display, optionally within a user interface, such as a graphical user interface.

The graph includes nodes representing entities, where nodes are connected by edges. Entities may be associated with attributes. Nodes of entities are associated with elements. Scores are computed for pairs of entities, as described herein. Scores may represent containment relation between corresponding sets of elements of the pair of nodes, and/or "distance" or the magnitude of containment between the pair of nodes.

The graph may be iteratively generated, starting from an entity with a largest number of elements to an entity with a smallest number of elements. In each iteration, a node representing a certain entity is connected to relevant predecessor nodes representing predecessor nodes (e.g., all maximal ancestors) of which the certain entity includes at least a subset of elements of the predecessor nodes.

Edges are defined for connecting nodes that represent at least a partial subset of one another. The edge may be defined according to the score relative to the tolerance parameter, for example, overlapping (e.g., intersecting) in at least one element and/or including a smallest unit of containment of one set of elements of one entity by the other set of elements of the other entity, for example, {1,2,3,4,5} and {5,6,8,9} may be connected by an edge when the score of the edge is below the tolerance parameter, as described herein.

Scores of edge may be represented visually, for example, amount of opaqueness, length of the edge, thickness of the edge, and/or a label in proximity to the edge with a value of the score.

Optionally, an initial graph is created using an initial value of the tolerance parameter, for example, zero or other minimal value of the tolerance parameter. The initial graph includes edges between pairs of nodes that have scores of zero, i.e., one set of elements of one entity is entirely contained within another set of elements of another entity, such as a distance of zero between elements of the entities and/or complete overlap (e.g., intersection) between elements of the entities. For example, {1,2,3,4,5} and {2,3,5}. The score of zero (or other minimal value of the tolerance parameter) may indicate that a first entity is a proper subset of a second entity connected by the edge. An increasing value greater than zero indicates that the first entity is an increasingly mismatching subset of the second entity.

Alternatively, when the value of the tolerance parameter is above the lowest score (e.g., above zero), edges with highest scores closest to the tolerance parameter without exceeding the tolerance parameter are created or maintained between nodes. Higher scores of edges indicate one node connected to the edge is almost-a-subset of the other node connected to the edge.

An edge between a first entity and second entity may be created by setting the first entity as a predecessor of the second entity, where at least one element of the second entity is a subset of elements of the first entity. First nodes of edges having scores lower than then tolerance parameter are defined as predecessors of second nodes connected to the first nodes by the respective edges.

It is to be understood that the goal in creating the graph is not necessarily to connect all nodes to each other, but rather to find a structure of the graph that may be optimized in an efficient way. For some values of the tolerance parameter, one or more nodes may be unattached to any other nodes via edges.

The graph may be presented visually as a directed acyclic graph (DAG). The direction of each edge may represent the direction of inclusion between two entities connected by the edge. For example, the edge represented as an arrow may point from the entity with the baseline (or larger) set of elements to the entity with the set of elements (e.g., smaller) which is contained in (e.g., overlaps/intersects with) the baseline set.

A predecessor entity node may be defined as a "soft subset" of its ancestor entity node, when acting on their corresponding sets of entities, such that there is no deeper node that contains it. Each node may appear once within a specific graph branch, taking advantage of the transitive property of the containment operator. Each node may have one or more ancestors (from different branches) and/or one or more predecessor node. A "soft subset" may be a set that is almost contained within the other subset, and adjustable based on the threshold of the tolerance value.

At 210, a tolerance parameter is dynamically adapted. The tolerance parameter indicates a threshold, which may represent a sensitivity of the inclusion between the entities, and/or an amount of accuracy of containment of elements between different entities and/or amount of overlap (e.g., intersection) between elements of entities and/or distance between elements of entities, and the like as described herein.

The effect of the tolerance is on the number of nodes presented, and the edges connecting them. The higher the tolerance, the more nodes and edges will be presented on the graph The tolerance parameter may be dynamically adapted by a control graphical element, for example, a slide widget, a dial, and a field for manual entry of a number. The control graphical element may be presented within the GUI simultaneously presenting the graph. The graph is dynamically updated in response to dynamic adaptations of the control graphical element, for example, as described herein with reference to 212 of FIG. 2. The GUI depicts the dynamically updated graph. The graph may be updated in real time, or near real time, in response to adaptation of the control graphical element.

The tolerance parameter may represent a sensitivity of the inclusion between the elements of the entities. The desired and/or tolerated accuracy between the elements of the entities. For example, the entities A={1,2,3,4} and B={1,2,3,5} overlap in {1,2,3}, but differ in the values {4} and {5}. The score between A and B may be 0.3. A tolerance parameter value of zero indicates a high sensitivity of inclusion, requiring perfect overlap (e.g., intersection) and/or inclusion, which is not the case for entities A and B—as such no edge will connect A and B. A higher tolerance parameter, such as 0.4, indicates a lower sensitivity of inclusion, i.e., that the elements of A and B having a score of 0.2 which is less than 0.4, are close enough and/or good enough to be considered as being included in one another—as such an edge connected A and B is dynamically generated.

At 212, the graph is dynamically adapted in response to the dynamic adaptation of the tolerance parameter.

The graph is dynamically adapted by creating or removing edges between nodes according to the score of the respective pairs of entities (which may be connected by pre-existing edges or currently unconnected by edges) relative to the threshold defined by the tolerance parameter.

The graph may be dynamically adapted by computing and/or accessing (e.g., a previously computed) score between a pair of entities, including first entity (i.e., node of the graph) and a second entity (i.e., node of the graph). When the pair of entities is not connected by an edge, a new edge is added between the first entity and the second entity when the score is below the threshold. When the pair of entities are connected by an existing edge, the existing edge between the pair of entities may be removed when the score of the existing edge is above the threshold.

A number of edges of the graph is increased with increasing value of the tolerance parameter. This is since it is more likely to find pairs of entities which are imperfectly included in one another. The number of edges of the graph is decreased with decreasing value of the tolerance parameter. This is since it is less likely to find pairs of entities which are increasingly more perfectly included in one another. In other words, the higher the tolerance parameter, the more likely one entity is a predecessor of another entity. The lower the tolerance parameter, the less likely one entity is a predecessor another entity.

Edges with highest scores may be created by removing other edges with scores lower than the highest scores. For example, in cases where there is an option to create an edge with a higher score (less than the tolerance parameter) or an edge with a lower score, the edge with the higher score is created. Alternatively, all edges with scores less than the tolerance parameter are created.

Optionally, when the tolerance parameter=0.0, each entity (i.e., set of elements) is either contained one or more other entities (i.e., other sets of elements), or not. When a first entity is contained within a second entity, and the second entity is maximal in the sense there is no bigger subset that resides between the first and second entities—the second entity is designated as predecessor of the first entity in the graph. An edge is created between the first entity and the second entity, optionally in a direction from the second entity to the first entity. Each node can have several ancestors and several predecessors.

Alternatively, when the tolerance parameter >0.0, a score is computed over each pair of entities, for example, a distance function (e.g., partial Jaccard distance, Euclidean distance) is computed for each pair. In a pair of entities for which scores that are lower than the tolerance, one entity is defined as a predecessor of another entity. An edge is created between the pair, as described herein.

At 214, the updated graph may be dynamically adapted. The adaptation to the graph may be performed based on the structure of the updated graph, which is different than adapting the graph based on scores in view of the tolerance parameter.

The adaptation based on the structure of the graph may include, for example, merging of two or more entities, and/or removal of anomaly nodes.

Optionally, two entities connected by an edge are automatically merged. The entities may be merged, for example, by merging the elements of the entities and/or merging the attributes of the entities. For example, creating a single entity that includes a union of the two entities. Attributes of the two entities that are merged into the single entity may be merged and applied to the elements of the single entity.

Merging entities may eliminate redundancy in the network, for example, redundancy attributes of the at least two entities may be removed. For example, when the entities are departments, attributes are access permissions to access data and/or services, and entities are users of the network, two departments may be merged into a single department when there is sufficient intersection between the two departments. A merged attribute, i.e., access permission, may be applied to the users of the merged department. This improves management of the network, for example, by reducing the number and/or complexity of user identifiers and/or access permissions in the network.

In another example, entities represent rules characterized by a set of elements including literals of its expression. Given two rules that grant the same permissions, but one rule has the literals $\{1,2,3\}$ and the other has the literals $\{1,2\}$. As $\{1,2\}$ is a subset of $\{1,2,3\}$, then the rule of the latter is redundant—all the employees that are caught by the expression of the latter are also caught by the expression of the former, and they both granting the same permissions. The rules may be combined, or one or may be removed, or other operations may be performed accordingly.

Optionally, an anomaly node is automatically detected. The anomaly node may be detected as a node that is not connected to any other node. This may indicate that the entity represented by the node is not a subset or a superset of any other entity. The anomaly node may be detected as a node that is a predecessor of all the leaves nodes. Such as entity may represents an empty set (or includes very few elements). This may indicate that the entity represented by the node has few to no actual elements and thus can be eliminated. Actions may be taken accordingly. For example, automatically removing attributes of the entities of the node, and/or automatically revoking attributes of the entities of the node. The anomaly node may be automatically removed from the graph.

At 216, the graph may be automatically adapted by a user via the GUI.

For example, a selection of at least two entities connected by an edge is received via the GUI. For example, a user clicks on the edge that connects two nodes and/or clicks on the nodes connected by the edge. The selected entities may be automatically merged into a single entity.

By visualizing the graph, a user may determine whether two or more entities should be combined. For example, the user might decide to merge two permissions if the user sees, according to the graph, that the two permissions include the same (or almost the same) employees.

In another example, the user may interact with GUI for removing entities from the graph, for example, by clicking a node and indicating removal of the node. In another example, the user may interact with the GUI for adding additional nodes, for example, selecting an option to add a node, and defining the elements of the node. Edges may be automatically generated as described herein, by computing scores and adding edges according to the score of the edges relative to the tolerance parameter.

Based on dynamically adapting the tolerance parameter and viewing the changes to the structure of the graph, users may decide on actions such as merging close entities, finding anomalies in the data, and the like.

At 218, one or more parameters of the network may be automatically adapted and/or implemented based on adaptations performed to the graph. For example, attributes may be automatically updated based on mergers of entities of the graph. For example, access permission levels of users which belonged to two different user groups which were merged into a single user group may be updated automatically. In another example, two sets of rules merged into a single rule may be updated in the network.

The adaptation may be automatically performed, for example, by converting the adaptation into code instructions, and/or generating code instructions according to the new state of the graph such as a merger of two entities associated with attributes and elements. The code instructions may be executed for updating the network accordingly.

At 220, one or more features described with reference to 202-218 may be iterated.

The network may be monitored for detecting changes in entities and/or attributes and/or elements. For example, an employee left the company, which may be detected by a removal of user credentials from a group denoting the department that the employee worked in. In another example, an update to network security software triggered an update to a set of rules for determining access.

Detected changes may trigger an iteration for generating an updated graph.

The graph may be dynamically updated according to dynamic updates of entities of the network and/or dynamic updates of elements of the entities of the network and/or dynamic updates of the attributes. Scores may be dynamically computed or recomputed based on the updated entities. The tolerance parameter may be dynamically applied to the updated scores, for updating the edges between nodes. Automated actions may be updated, for example, automated merging may be updated.

Referring now back to FIG. 3A-3C, schematics depicting dynamic adaptation of a graph in response to dynamic changes in a value of a tolerance parameter are depicted.

The following are 5 permission entities and the user credentials (IDs) that have the permission entities, where Permission is a certain entity, Name is the tag assigned to the corresponding permission, and Set indicates the IDs of users that have the corresponding permission:

Permission 1:
  Name: all users
  Set: $\{1,2,3,4,5,6,7,8,9,10\}$
Permission 2:
  Name: R&D
  Set: $\{2,3,4,5,7,8,9\}$
Permission 3:
  Name: PM Set: {1,3,4,5,6,7}
Permission 4:
  Name: all admin
  Set: {1,2,3,4}
Permission 5:
  Name: VP
  Set: {2}

A graph is constructed in accordance with at least one embodiment described herein. The graph includes representing entities of elements, connected by edges, as described herein. Nodes of the graphs represent the 5 permissions. Each node includes the set of IDs associated with the corresponding permission of the respecting node. Edges connecting nodes are created as described herein. Scores are computed as described herein, and assigned to respective edges.

FIG. 3A represents a graph 302 created for a value of a tolerance parameter of zero, where each node is an accurate subset of its predecessor(s), as described herein. Graph 302 includes node 304 representing permission 1, node 306 representing permission 2, node 308 representing permission 3, node 310 representing permission 4, and node 312 representing permission 5. Node 306 is a descendant of and connected to node 304 with an edge 314 having a score of 0 (note direction of edge 314 and other edges of the graph indicating the containment relationship). Node 308 is a descendant of and connected to node 304 with an edge 315 having a score of 0. Node 310 is a descendant of and connected to node 304 with an edge 316 having a score of 0. Node 312 is a descendant of and connected to node 310 with an edge 318 having a score of 0, and to node 306 with an edge 320 having a score of zero. A score of 0 indicates no distance between elements of two nodes connected by an edge.

FIG. 3B represents an adapted graph 330, which is created by adapting graph 302 of FIG. 3A and/or by re-computing scores of the nodes for generation a new graph, in response to adapting the value of the tolerance parameter to 0.3. New edge 332 is created between node 310 and its predecessor node 306. Another new edge 334 is created between node 310 and it predecessor node 308. The score computed for edge 332 is 0.2, since the elements of node 310 are not an accurate subset of the elements of node 306, i.e., node 310 includes element 1 which is not found in the elements of node 306. Moreover the score computed for edge 334 is 0.2, since the elements of node 310 are not an accurate subset of the elements of node 308, i.e., node 310 includes element 2 which is not found in the elements of node 308. The score of 0.2 is below the threshold of 0.3 defined by the current value of the tolerance parameter. The score of 0.2 may indicate the distance (e.g., Euclidean distance) between the elements of nodes 310 and 306, For example, the score of 0.2 may be computed as the distance between a vector of elements {2,3,4,5,7,8,9} of node 306 and a vector of elements {1,2,3,4} of node 310. Similarly, the score of 0.2 may indicate the distance (e.g., Euclidean distance) between the elements of nodes 310 and 308, For example, the score of 0.2 may be computed as the distance between a vector of elements {1,3,4,5,6,7} of node 308 and a vector of elements {1,2,3,4} of node 310. Edge 316 has been removed in order to create new edges 332 and 324, since due to the increase in the value of the tolerance parameter, node 310 is closer to being a descendant of nodes 306 and 308 than of node 304. In particular, since the score of 0.2 of edge 332 and the score of 0.2 of edge 334 is higher than the score of 0 of edge 316, while still remaining below the threshold of the tolerance parameter 0.3, indicating that node 310 is closer to being a descendant of nodes 306 and 308 than of node 304, as described herein. When there is a choice between multiple edges with different scores, the edge with highest score that is still lower than the threshold of the tolerance parameter is selected, as described herein. Edge 318 between node 312 and its predecessor node 310 is maintained. Edge 314 between node 306 and its predecessor 304 is maintained. Edges 314 and 318 are maintained since they are perfectly contained within their predecessors, and no nodes where scores are higher yet still below the tolerance parameter are found.

FIG. 3C represents an adapted graph 340, which is created by adapting graph 330 of FIG. 3B and/or by re-computing scores of the nodes for generation a new graph, in response to adapting the value of the tolerance parameter to 0.4. New edge 342 is created between node 308 and its predecessor node 306. The score computed for edge 342 is 0.3, since the elements of node 308 are not an accurate subset of node 306, i.e., node 308 includes elements 1 and 6, which are not included in node 306. For example, the score of 0.3 may be computed as the distance between a vector of elements {1,3,4,5,6,7} of node 308 and a vector of elements {2,3,4,5,7,8,9} of node 306. The score of 0.3 is below the threshold of 0.4 defined by the current value of the tolerance parameter. The score of 0.3 may indicate the distance (e.g., Euclidean distance) between the elements of nodes 308 and 306, which is greater than the distance between the elements of nodes 310 and 306 represented by the score of 0.2. The other edges of graph 330 are maintained, since no pairs of additional nodes where scores are higher than existing scores yet still below the tolerance parameter are found.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant GUIs will be developed and the scope of the term GUI is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computer implemented method of automated permission management of user identities of a network, comprising:

accessing a graph including a plurality of nodes denoting a plurality of different groups having different access permissions levels for accessing data sources and/or services of a network, each group associated with a respective set of user identities, the graph including edges between nodes that represent at least a partial subset of one another, each edge associated with a score indicating an accuracy of containment between groups connected by the edge;

dynamically adapting a tolerance parameter indicating a threshold for amount of accuracy of containment of user identities between different groups via a control graphical element presented within a graphical user interface (GUI) simultaneously presenting the graph;

in response to the dynamic adaptation of the tolerance parameter, dynamically adapting the graph in real time by creating or removing edges between nodes according to the score of the respective edges relative to the threshold defined by the tolerance parameter, wherein a number of edges of the graph is increased with increasing value of the tolerance parameter, and the number of edges of the graph is decreased with decreasing value of the tolerance parameter, for creating a dynamically updated graph;

automatically merging access permission levels of at least two groups connected by an edge for automatically eliminating redundant access permission levels of the at least two groups; and automatically updating access permission levels of the at least two groups according to the dynamically updated graph.

2. The computer implemented method of claim 1, wherein edges with highest scores closest to the tolerance parameter without exceeding the tolerance parameter are created or maintained between nodes.

3. The computer implemented method of claim 2, wherein the edges with highest scores are created by removing other edges with scores lower than the highest scores.

4. The computer implemented method of claim 1, wherein all user identities of a certain group are assigned the same access permission level of the certain group.

5. The computer implemented method of claim 1, wherein the groups are selected from: department, division, a title, and a certain number of years of experience.

6. The computer implemented method of claim 1, further comprising:
extracting the plurality of groups from the network;
extracting the plurality of user identities from the network;
mapping the plurality of users to the plurality of groups;
creating the graph by arranging the plurality of groups into the plurality of nodes; and
linking nodes with edges according to sets of user identities of groups that are subsets of one another.

7. The computer implemented method of claim 1, wherein the graph is dynamically adapted by:
computing the score between a first group and a second group which are not connected by an edge;
adding a new edge between the first group and the second group when the score is below the threshold; and
removing an existing edge between a pair of groups when the score of the existing edge is above the threshold.

8. The computer implemented method of claim 1, wherein the graph is iteratively generated, starting from an group with a largest number of user identities to an group with a smallest number of user identities, wherein in each iteration a node representing a certain group is connected to relevant predecessor nodes representing predecessor nodes of which the certain group includes at least a subset of user identities of the predecessor nodes.

9. The computer implemented method of claim 1, further comprising:
automatically detecting an anomaly node not connected to any of the other nodes; automatically removing access permissions of the groups of the node; and
automatically removing the anomaly node from the graph.

10. The computer implemented method of claim 1, further comprising:
automatically detecting an anomaly node that is a predecessor of all leaf nodes;
automatically revoking access permissions of the groups of the node; and
automatically removing the anomaly node from the graph.

11. The computer implemented method of claim 1, wherein the control graphical element is implemented as at least one of: a slide widget, a dial, and a field for manual entry of a number.

12. The computer implemented method of claim 1, wherein the graph is directed and acyclic, the direction of an edge indicating direction of containment of a certain group by a predecessor group.

13. The computer implemented method of claim 1, wherein the score is a function of a first subset of user identities of a certain group included in a predecessor group connected to the certain group by an edge, and of a second subset of user identities of the certain group not included in the predecessor group.

14. The computer implemented method of claim 1, wherein the score of each edge represents an accuracy of a first node of the edge being contained by a second node of the edge.

15. The computer implemented method of claim 1, wherein the score of an edge indicates a magnitude of a distance between two groups connected by the edge, wherein a larger distance indicates a larger mismatch between user identities of the two groups connected by the edge.

16. The computer implemented method of claim 1, wherein first nodes of edges having scores lower than then tolerance parameter are defined as predecessors of second nodes connected to the first nodes by the respective edges.

17. The computer implemented method of claim 1, wherein the score of zero indicates that a first group is a proper subset of a second group connected by the edge, and an increasing value greater than zero indicates that the first group is an increasingly mismatching subset of the second group.

18. The computer implemented method of claim 1, wherein an edge between a first group and second group is created by setting the first group as a predecessor of the second group, wherein at least one user identity of the second group is a subset of user identities of the first group.

19. The computer implemented method of claim 1, wherein the graph is dynamically updated according to dynamic updates of groups of the network and/or dynamic updates of user identities of the groups of the network, and in response to the dynamic update of the graph, the tolerance parameter is dynamically updated, and the automatically merging is updated.

20. The computer implemented method of claim 1, wherein the control graphical element is an interactive control graphical element denoting a value of a tolerance parameter indicating a threshold for amount of containment between different groups;
the method further comprising:
receiving via the GUI, a dynamic adaptation of the tolerance parameter denoted by dynamic interaction with the interactive control graphical element; and
dynamically adapting the graph, within the GUI, by creating or removing edges between nodes according to the score of the respective edges relative to the threshold defined by the tolerance parameter.

21. The computer implemented method of claim 20, further comprising automatically updating access permission levels of the at least two groups according to the dynamically adapted graph.

22. The computer implemented method of claim 1, further comprising, via the GUI, receiving a selection of at least two groups connected by an edge, and automatically merging the selected at least two groups into a single group.

23. A system for automated permission management of user identities of a network, comprising:
at least one hardware processor of a computing device, executing a code for:
accessing a graph including a plurality of nodes denoting a plurality of different groups having different access permissions levels for accessing data sources and/or services of a network, each group associated with a respective set of user identities, the graph including edges between nodes that represent at least a partial subset of one another, each edge associated with a score indicating an accuracy of containment between groups connected by the edge;
dynamically adapting a tolerance parameter indicating a threshold for amount of accuracy of containment of user identities between different groups via a control graphical element presented within a graphical user interface (GUI) simultaneously presenting the graph;
in response to the dynamic adaptation of the tolerance parameter, dynamically adapting the graph in real time by creating or removing edges between nodes according to the score of the respective edges relative to the threshold defined by the tolerance parameter, wherein a number of edges of the graph is increased with increasing value of the tolerance parameter, and the number of edges of the graph is decreased with decreasing value of the tolerance parameter, for creating a dynamically updated graph;
automatically merging access permission levels of at least two groups connected by an edge for automatically eliminating redundant access permission levels of the at least two groups; and
automatically updating access permission levels of the at least two groups according to the dynamically updated graph.

* * * * *